United States Patent [19]

Nakamura

[11] 4,306,288

[45] Dec. 15, 1981

[54] DATA PROCESSING SYSTEM WITH A PLURALITY OF PROCESSORS

[75] Inventor: Teruo Nakamura, Tokyo, Japan

[73] Assignee: Nippon Electric Co., Ltd., Tokyo, Japan

[21] Appl. No.: 116,197

[22] Filed: Jan. 28, 1980

[51] Int. Cl.³ .............................................. G06F 9/00
[52] U.S. Cl. .................................................. 364/200
[58] Field of Search ............................... 364/200, 900

[56] References Cited

U.S. PATENT DOCUMENTS

| | | | |
|---|---|---|---|
| 3,810,119 | 5/1974 | Zleve et al. | 364/200 |
| 4,034,354 | 7/1977 | Simmons | 364/900 |
| 4,047,162 | 9/1977 | Dorey et al. | 364/900 |
| 4,073,005 | 2/1978 | Parkin | 364/200 |
| 4,099,234 | 7/1978 | Woods et al. | 364/200 |
| 4,100,605 | 7/1978 | Holman | 364/900 |
| 4,149,241 | 4/1979 | Patterson | 364/200 |
| 4,183,089 | 1/1980 | Daughton et al. | 364/900 |

OTHER PUBLICATIONS

IBM Technical Disc. Bull. vol. 21, No. 7, Dec. 1978, p. 2765.

*Primary Examiner*—Gareth D. Shaw
*Assistant Examiner*—David Y. Eng
*Attorney, Agent, or Firm*—Sughrue, Mion, Zinn, Macpeak and Seas

[57] ABSTRACT

A multiprocessor initialization sequence provides diagnostic routines in each processor and interconnects the several processors only if the diagnostic routines indicate positive results. Apparatus external to the individual processors places the processors in an initialization mode during which time the diagnostic routines will be run. A host selection signal is sent to one of the plural processors and that processor in turn sends subprocessor selection signals to all of the other processors. The diagnostic routine for a given processor is initiated in response to either a host selection signal or a subprocessor selection signal. If a failure is detected in the diagnostic routine in the host processor, the failure is registered and sent to all subprocessors. If a failure is detected in a subprocessor, it is simply registered as a failure but not sent to the host processor. If there are no failures detected in a subprocessor, and if the subprocessor did not receive a failure indication signal from the host, this subprocessor will connect directly to the communication interconnection path for communicating between the various processors. If no failure is detected in the diagnostic routine of the host processor, the host processor will await the receipt of an end report from the subprocessor which signal indicates that the subprocessor completed its diagnostic routine without any failures being detected. When the end report signal is received within a given time, the host processor will be connected to the communications interconnection paths.

1 Claim, 6 Drawing Figures

DATA PROCESSING SYSTEM WITH A PLURALITY OF PROCESSORS

BACKGROUND OF THE INVENTION

This invention relates to a data processing system with a plurality of processors and, more particularly, to a data processing system of this type capable of initializing the individual processors.

As complicated computer systems having functional versatility have come into practical use, the need arises for higher system reliability. Improved reliability results from scheduled maintenance or routine inspection for the computer system as well as improvements in performance of parts and components constituting the system. A conventional computer system is automatically diagnosed at the initializing stage to detect faults of the system. In response to a fault detection the system operation is stopped. For details of the system diagnosis at the initializing stage, reference is made to an article by A. M. Johnson titled "The Microdiagnostics for the IBM System 360 Model 30,"IEEE TRANSACTIONS ON COMPUTERS, Vol. C-20 No. 7, pages 798–803, July issue, 1971

A more effective system for the above-mentioned maintenance has recently been developed for practical use. In this system, a diagnostic program operates hardware or firmware, so that the system is forcibly operated in the worst operational condition. It follows consequently that defective parts are detected through the diagnosis and separated from the system, preventing erroneous operations from occurring while the system is in operation.

However, the above-proposed diagnosis techniques merely teach the detection of defective parts to separate them from the system with a single processor.

On the other hand, a multiprocessor system, which has a plurality of processors to improve the performance and reliability of the system, has been put into practical use. For details of the system construction at the initializing stage in such a conventional multiprocessor system, reference is made to "CONFIGURATION CONTROL" of IBM System/370 Model 168 Functional Characteristics, pages 48–49, published in 1976 by International Business Machine Corporation. According to this technique, an interface connection among processors is specified by a system-mode switch provided on the control panel. Then, a system-reset switch and a load switch, which are similarly provided on said panel, are operated in succession for initializing the system. As a result, the multiprocessor system is constructed as specified by the system mode switch, so that software is immediately loaded and executed by the individual processors. When the system is operated through the initializing operation as above mentioned, however, there is still a possibility of the so-called system down while in running.

An object of the invention is, therefore, to provide a data processing system with a plurality of processors free from the above-mentioned system down to maintain higher reliability of the system operation.

Another object of the invention is to provide a data processing system which automatically executes a system diagnosis at the initializing stage.

Yet another object of the invention is to provide an improved data processing system capable of automatically separating defective processors from the system in response to the result of the diagnosis.

SUMMARY OF THE INVENTION

A multiprocessor initialization sequence provides diagnostic routines in each processor and interconnects the several processors only if the diagnostic routines indicate positive results. Apparatus external to the individual processors places the processors in an initialization mode during which time the diagnostic routines will be run. A host selection signal is sent to one of the plural processors and that processor in turn sends subprocessor selection signals to all of the other processors. The diagnostic routine for a given processor is initiated in response to either a host selection signal or a subprocessor selection signal. If a failure is detected in the diagnostic routine in the host processor, the failure is registered and sent to all subprocessors. If a failure is detected in a subprocessor, it is simply registered as a failure but not sent to the host processor. If there are no failures detected in a subprocessor, and if the subprocessor did not receive a failure indication signal from the host, this subprocessor will connect directly to the communication interconnection path for communicating between the various processors. If no failure is detected in the diagnostic routine of the host processor, the host processor will await the receipt of an end report from the subprocessor which signal indicates that the subprocessor completed its diagnostic routine without any failures being detected. When the end report signal is received within a given time, the host processor will be connected to the communications interconnection paths.

BRIEF DESCRIPTION OF THE DRAWINGS

The invention will be described in greater detail with reference to the accompanying drawings in which.

Throughout the drawings, like reference numerals represent like structural elements.

DETAILED DESCRIPTION

Figure 1:
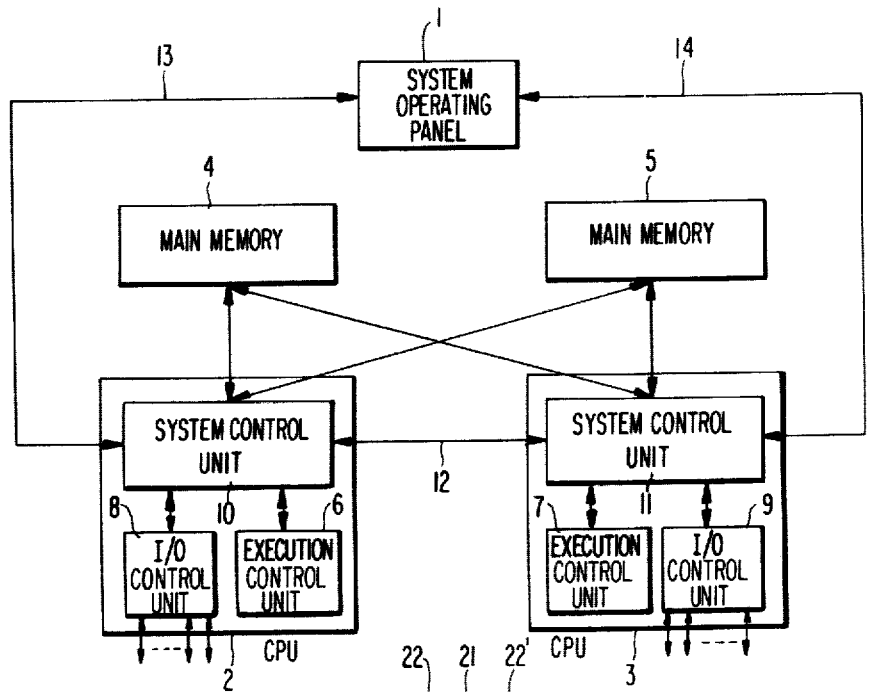
FIG. 1 shows a block diagram of one embodiment of the invention.

Referring now to FIG. 1, one embodiment of the invention includes a system operating panel 1 serving as an interface of an operator with the present system through which the system is operated externally, central processing units (CPUs) 2 and 3, and main memories (MMs) 4 and 5. The CPUs 2 and 3 have execution control units (ECUs) 6 and 7, input/output control units (IOCUs) 8 and 9, and system control units 10 and 11, respectively. The units 10 and 11 are located between the ECUs 6 and 7, the IOCUs 8 and 9, and the MMs 4 and 5, and perform various control operations. More specifically, these control operations include communication control operations between the ECUs 6 and 7, and between the ECUs 6 and 7, and the IOCUs 8 and 9; an access control operation from the IOCUs 8 and 9 to the MMs 4 and 5; a system configuration control operation in response to instructions given from the panel 1 and the ECUs 6 and 7; and a system control operation.

Main operational features of the invention lie in initializing the system directed from the panel 1 to the CPUs 2 and/or 3 through interfaces 13 and/or 14, and controlling the connection of an interface 12 between the CPUs 2 and 3.

Figure 2:
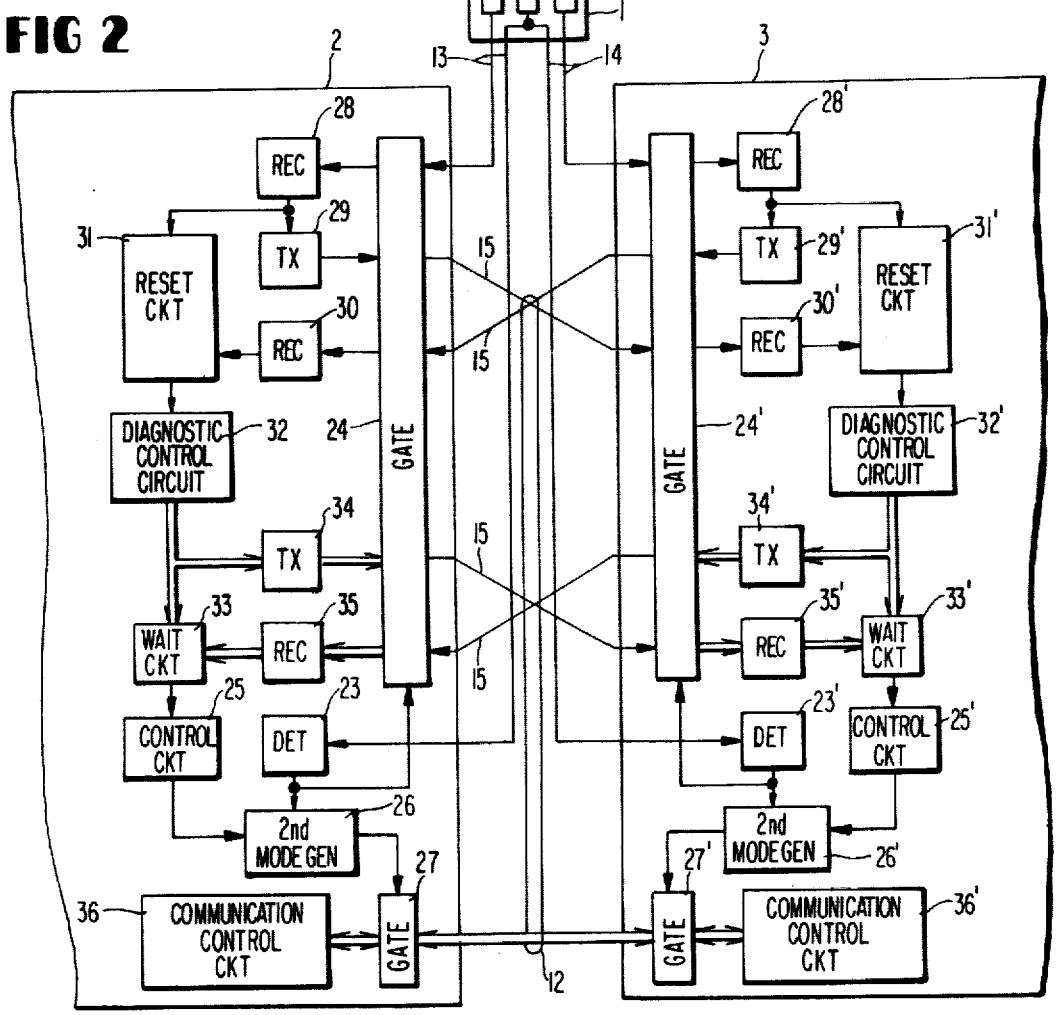
FIG. 2 shows a block diagram of a part of the embodiment shown in FIG. 1.

Further referring to FIG. 2, a multiprocessor mode switch 21 provided on the panel 1 controls the connection between the CPUs 2 and 3. System initializing switch 22 or 22' controls the system initialization operation. When the switch 21 is not operated, the switches 22 and 22' initialize the CPUs 2 and 3, respectively. On the other hand, when the switch 21 is operated, the entire system including the CPUs 2 and 3 is initialized. The later operation will be discussed hereinafter in detail.

It is assumed now that the CPU 2 is connected to an external unit (not shown) in on-line mode, and is placed in non-diagnostic mode, and the switch 21 provided on the panel 1 is operated. Under these conditions, the output signal of a first mode detection circuit 23 enables a gate 24 to initialize communication with the CPU 3. During a period of time that the gate 24 is enabled, if the switch 22 provided on the panel 1 is operated, an intializing signal passes through the gate 24 to reach a receiving circuit 28. The circuit 28 directs a transmitting circuit 29 to initialize another CPU 3 and at the same time drives a reset circuit 31 of the CPU 2. When the CPU 3 is in on-line mode and non-diagnostic mode, a detected signal derived from a first mode detecting circuit 23' enables a gate circuit 24' to permit the initializing signal from the circuit 29 of the CPU 2 to pass therethrough to reach a receiving circuit 30'. When an initializing signal from the gate 24 is received by the receiving circuit 28 or 30, the reset circuit 31 operates to initialize the CPU 2. The circuit 31 directs a diagnosis control circuit 32 to check the normality of the function of the CPU 2, i.e. to initiate a diagnostic operation. The diagnostic method is discussed in detail by Samir S. Husson in his paper entitled "MIRO PROGRAMMING, Principles and Practices" published in 1970 by PRENTICE-HALL INC., pages 109 to 112.

When the normality of the CPU 2 is confirmed, a waiting circuit 33 in the CPU 2 waits for an end signal indicative of the completion of the initializing operation in the CPU 3.

Figure 3:
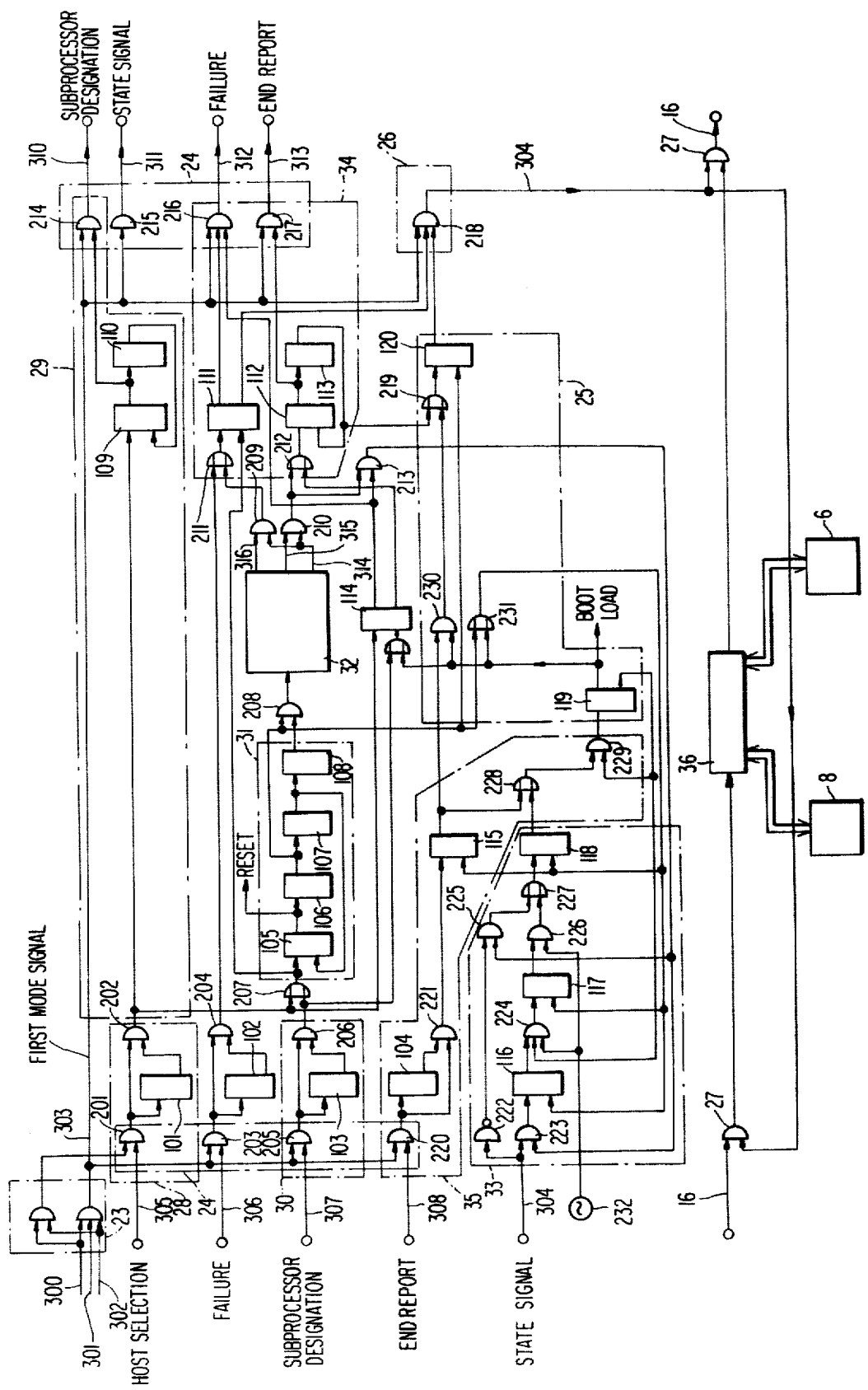
FIG. 3 is a circuit diagram showing the circuit of FIG. 2 in more detail.

On the other hand, the CPU 3 transmits said end signal to the CPU 2 through a transmitting circuit 34' and the gate circuit 24' and, at the same time, sets through a waiting circuit 33' a control circuit 25' which consists of flip-flops (F/Fs) 119 and 120, AND gates 230 and 231, and an OR gate 219 shown in FIG. 3.

The circuit 33' does not wait the end signal. As soon as a receiving circuit 35 receives the end signal from the CPU 3, a control circuit 25 having a structure similar to the circuit 25' is set through the circuit 33. When a second-mode designation signal is generated by a second mode generating circuits 26 or 26', the control circuits 25 or 25' operate communication gate circuits 27 or 27' to permit communication with the CPUs 3 or 2 from communication control circuits 36 or 36'; each of which is composed of a selector and registers (not shown). The interface 12 for inter-communication between the CPUs 2 and 3 comprises an initialization interface 15 and a communication interface 16.

Next, the initialization control for the present system will be described in greater detail referring to FIGS. 3 through 6. It should be noted that in FIG. 3, reference numerals 101 to 120 designate F/Fs; 201 to 231, logic circuits; and 300 to 316, main signal lines. Also, it is to be noted that in FIG. 6, waveforms are those of the signals derived from the corresponding components. Furthermore, although FIG. 3 only shows the detailed circuit corresponding to the blocks of FIG. 2 in the CPU 2, it will be appreciated that corresponding circuitry exists for CPU 3 and such circuitry will be referred to in the text herein by referring to primed members. For example, while FIG. 3 only shows flip flop 114 of CPU 2, reference to flip flop 114' will be understood as referring to the corresponding flip flop in CPU 3.

A multiprocessor mode signal designates the simultaneous initializing operation of the CPU 2 and the CPU 3. The multiprocessor mode signal is supplied through a signal line 300 in response to the direction of the panel 1 (FIG. 2) when the switch 21 is operated. Also, logical "1" appears on a signal line 301 when the CPU 2 is in on-line mode, and logical "1" appears on a signal line 302 when the CPU 2 is in non-diagnostic mode. As a result, a logical product of the signals on the lines 300, 301 and 302 is produced from the detection circuit 23 and appears on a signal line 303 when the CPU 2 is in on-line mode and in non-diagnostic mode and switch 21 is operated. This signal is the first mode signal, otherwise referred to as a mode signal to determine the connection or disconnection of the interface between the CPUs used in the execution of initializing the CPUs. The first mode signal is transferred through the signal line 303 from the circuit 23 to the circuits 24, 30, and 35. When switch 22 is operated, a logical "1" signal appears on a signal line 305 (A in FIG. 6) and is applied via gate 201 of circuit 24 to flip flop 101 and gate 202 of receiver circuit 28. The logic "1" signal on 305, which determines that CPU 2 will be the host processor, is differentiated at the leading edge thereof by the combination of an F/F 101, AND circuits 201 and 202 (see B of FIG. 2). The output of the gate 202 sets F/F 105 of reset circuit 31, sets F/F 114, so that the CPU 2 becomes a host processor (C of FIG. 6), and sets F/F 109 of transmitter 29. The transmitting circuit 29 produces an initialization designation signal for a period of two clocks using F/Fs 109 and 110 (D and E in FIG. 6). When a signal on the signal line 303 is logical "1", the initialization designation signal is permitted through an AND circuit 214 and a signal line 310 to reach the CPU 3 (FIG. 2).

The designation signal from CPU 2 is supplied to a signal line 307' of the CPU 3, passes through gate 205' of circuit 24' and is received by the receiving circuit 30'. An F/F 103' and an AND circuit 206' of receiver 30' produce a leading edge differential signal (F in FIG. 6) which is applied through OR gate 207' to F/F 105' of reset circuit 31'. At the same time an F/F 114' is reset to indicate that the CPU 3 is not a host CPU. Thus, in CPU 2 the reset circuit 31 has been activated and the flip flop 114 has been set as a result of the first mode signal on line 303 and the host selection signal on 305. On the other hand, in CPU 3 the reset circuit 31' has been activated and the flip flop 114' reset as a result of the first mode signal on line 303' and the designation signal on line 307'.

Figure 6:
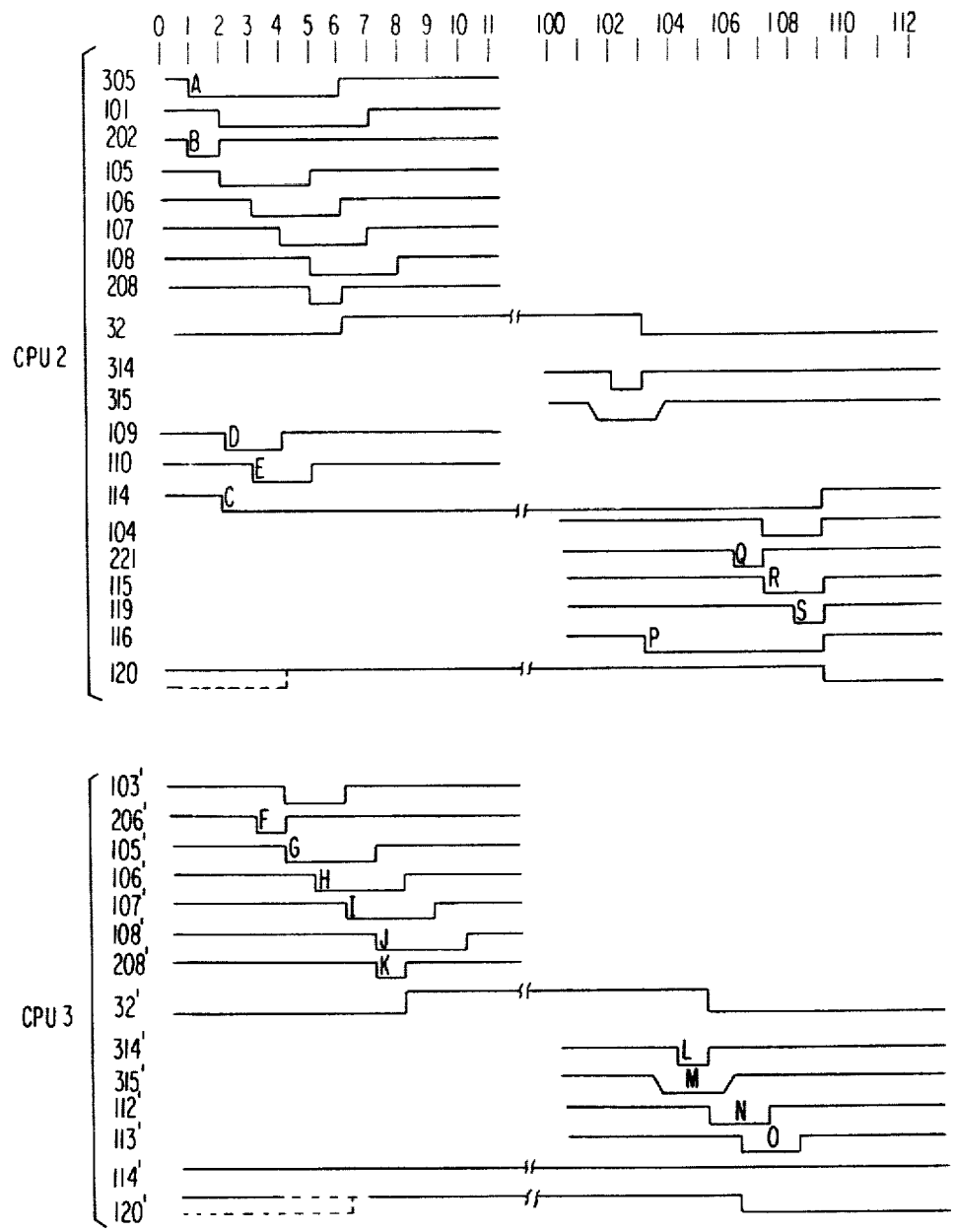
FIG. 6 is a timing chart for describing the operation of the circuit in FIG. 3.

In the circuit 31', F/Fs 105', 106', and 107' form a reset signal which is kept in logical "1" state over a three clock period (see G, H and I in FIG. 6). The reset signal is used to initialize the contents of all the F/Fs used in the CPU 3. After a further delay of one clock period by an F/F 108' (J in FIG. 6) a signal is provided via gate 208' to drive a diagnosis control circuit 32' to perform a diagnostic routine on CPU 3. The execution result in the circuit 32' is outputted as a diagnosis end signal (L in FIG. 6), a failure undetected signal (M in FIG. 6) and a failure detected signal through signal lines 314', 315', and 316', respectively.

It is to be noted that the diagnosis operation of the host processor 2 is similarly performed in parallel with that of the subprocessor 3 in response to the initialization designation signal of the processor 2.

Figure 4:
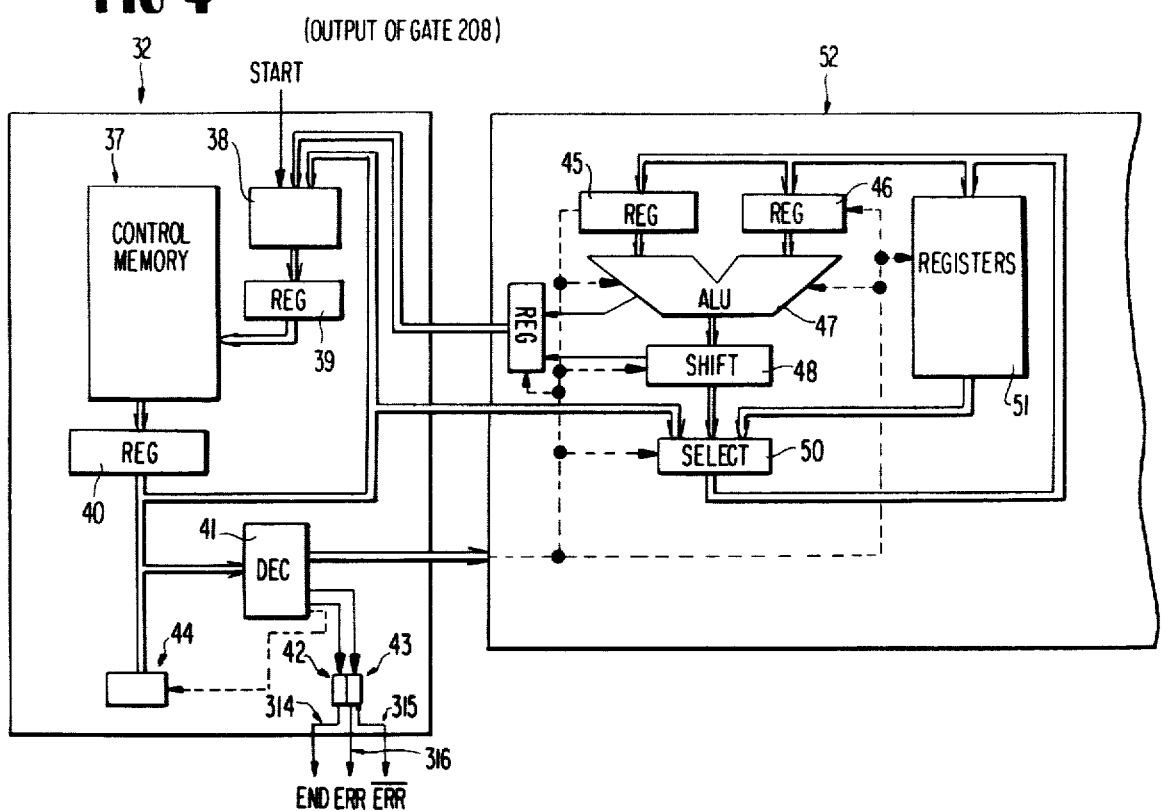
FIG. 4 is a circuit diagram showing in greater detail a part of FIG. 3.
Figure 5:
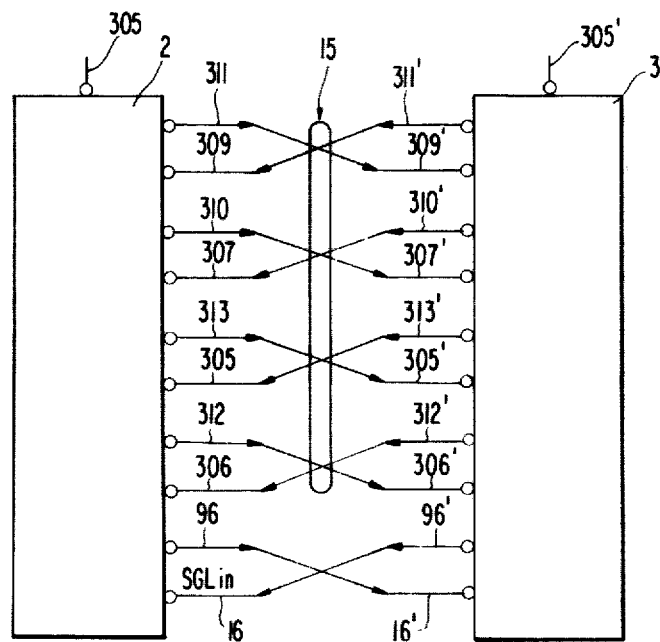
FIG. 5 illustrates another part of the embodiment of FIG. 1.

The construction and the operation of the diagnosis control circuit 32 will be described with respect to a diagnostic operation executed by microinstructions (referred to as instructions) referring to FIG. 4. As shown, the circuit 32 is composed of a control memory 37 for storing microprograms including diagnosis microprograms, a read address register 39, a read address formation circuit 38, a read data register 40, a decoder 41 for decoding the instruction read out from the control memory 37, a diagnosis end-indicating F/F 42, a failure detection-indicating F/F 43, and a failure cause-indicating F/F 44. A circuit 52 to be diagnosed comprises registers 45 and 46, an arithmetic logic circuit 47, a shifter 48, a selector 50, a group of registers 51, and a register 49 for holding overflow, underflow, zero-detection and shift-out bit from the circuit 47, and the shifter 48. Those circuits are all controlled by the output signals of the decoder 41.

In response to the output of an AND circuit 208, the diagnostic operation starts, so that the address formation circuit 38 forms the first instruction storing address for the diagnosis program to read out the instruction in the control memory 37 into the data register 40 through the address register 39. The instruction is decoded by the decoder 41 and the control circuit sets the same data from the data register 40 into the registers 45 and 46, through the selector 50. In accordance with the instruction read out into the data register 40, the subtraction command is directed to the circuit 47 while at the same time the zero detection as the operation result outputted from the circuit 47 is set in the register 49. Responsive to the next instruction, the circuit 38 determines the fourth instruction address in response to the zero detection result set in the register 49. At the same time, the identifying number of the diagnosis step is set in the indicating F/F 44. If the zero detection has been reported correctly to the circuit 38, the circuit 38 forms the first instruction address for the next diagnosis instruction, so that the next diagnosis instruction is executed. If the zero detection is incorrectly reported, the circuit 38 forms the address for an instruction to report the error detection, and the instruction is read out through the address register 39. Upon this instruction, the F/Fs 42 and 43 are set through the decoder 41. The F/Fs 42 and 43 produce a diagnosis end signal, a failure undetected signal, and a failure detected signal through signal lines 314, 315, and 316, respectively. Functions of the arithmetic logic circuit 47, the shifter 48, the register group 51, and the data paths interconnecting the system components are diagnosed by comparing the content of register 45 with that of the register 46 by the circuit 47. In this way, when all the diagnoses are complete, an instruction is executed to set the F/F 42 to indicate that no errors have occurred in the CPU 2.

When a failure detection is reported from the circuit 32', a failure indicating F/F 111' is set through AND circuit 209' and OR circuit 211' of the circuit 34' to indicate that the diagnosed processor, i.e. CPU 3, is defective. The set output from F/F 111' is applied as one input to gate 216'. The other inputs to gate 216' are the line 303' and the set output line from host/ subprocessor designating F/F 114'. In this case since CPU 3 is a subprocessor, the F/F 114' set output is logical "0". Therefore the failure indicating state in F/F 111' will not appear on output line 312' and thus will not be reported to the host processor CPU 2.

On the other hand, if the host processor has a failure, since F/F 114 will be in the set state, the failure will pass through gate 216, appear on output line 312 and be applied to CPU 3 via line 306'. The failure indicating signal from the host will be applied through gate 203' and then to F/F 102' and AND gate 204', the latter two elements differentiating the signal. The differentiated signal will be applied via OR gate 211' to the set input of failure indicating F/F 111'. Thus, in the subprocessor, CPU 3, the F/F 111' will be set if there is a failure detection in either the subprocessor itself or the host, whereas in the host, the F/F 111 will be set only if there is a failure detection in the host itself. The setting of F/F 111 stops further initializing of its CPU. Note in this case gate 218 of the second mode signal generator 26 will not be fully activated.

When the diagnostic routine terminates in a failure undetected the signal lines 314 and 315 will have logical "1's" thereon. The sequence that follows depends on whether the CPU is the host or a subprocessor. If a subprocessor, e.g. CPU 3, gate 212' will be opened and gate 213' closed. The reverse will be true if the CPU is the host.

The failure undetected signal in a subprocessor will pass through gate 212' to F/F 112' of circuit 34'. The F/Fs 112' and 113' generate a two clock period signal which is sent via gate 217' and line 313' to the host to indicate that the subprocessor finished its diagnosis with a failure undetected. The signal on line 313' logical product becomes an end report signal showing that the initialization for the CPU 3 has been completed.

The F/F 113' also serves to set through the OR circuit 219' the F/F 120' for controlling the connection/-disconnection of the interface between the CPUs after the system construction has been completed. It will be noted that in a subprocessor, the wait circuit 33' has been by-passed.

Immediately after the failure undetection is reported, the waiting circuit 33 waits the end report signal from the CPU 3. A state signal of the CPU 3 to determine the connection/ disconnection of the interface between the CPUs used in the execution of the initializing process is applied to the report waiting circuit 33 through signal lines 311' and 309.

Logical "0" of the state signal directs the disconnection of the interface between the CPUs with the result that an F/F 118 is set through gates 222, 225 and 227. If a signal line 309 carries logical "1", the report waiting circuit 33 is driven. This circuit 33 is composed of gates 222, 223, 224, 225, 226, and 227, and the F/Fs 116, 117 and 118, and an oscillator 232 generates a pulse with a repetition period of 0.5 second. Firstly, the F/F 116 is set through the AND circuit 223 (P in FIG. 6). The first pulse of the oscillator 232 sets the F/F 117 through the AND circuit 224. Upon receipt of the initialization end report, the F/Fs 116 and 117 are reset by an F/F 119 through an AND gate 231. The output of the F/F 119 is used as a control signal for reading out the program for excuting the system operation, which is stored in the main memory 4 or 5. If the F/F 117 is set to logical "1" and said pulse becomes further logical "1", the F/F 118 is set through the gates 226 and 227. The setting of the F/F 118 indicates that the CPU 3 provides no response.

The initializing end report signal supplied from the CPU 3 to the CPU 2 through the signal lines 313' and 308, is received by the circuit 35 of the CPU 2. The receiving circuit 35 connects the signal lines 308 and 303 to an AND circuit 220 where a logical product of both signals on the lines 308 and 303 produced to give a signal representing the connection. The connection signal is differentiated at the leading edge by an F/F 104 and an AND circuit 221 (Q in FIG. 6) to set an F/F 115 (R in FIG. 6). An OR circuit 228 takes a logical sum of the output of the F/F 118 and the output of any F/F 115. The result of the logical sum sets the F/F 119 through a gate 229 (S in FIG. 6). When the F/F 119 is logical "1", the receiving circuit 35 and the waiting circuit 33 are reset.

In response to a logical "1" of the F/F 119, if the F/F 115 is logical "1", the AND gate 230 becomes logical "1". This state indicates that the initialization end report signal applied from the CPU 2. The output of the AND circuit 230 sets the F/F 120 through the OR circuit 219. The circuit constructed by those gates 230, 219, 229, and the F/F 119 is used to connect the interface between the CPUs used after the system including the processor as the host is constructed.

A logical product of the outputs of the F/F 120 and the F/F 111 and the signal on the line 303 is produced by an AND circuit 218. The logical product from the AND gate 218 is generated on a signal line 304 as a signal representing the connection/disconnection between the CPU 2 and the CPU 3 after the system construction has been completed.

A logical product of the signal on the signal line 304 and the output signal of the communication control circuit 36 is produced by the gate 27. The logical product on the signal line 304 designates communication with the other CPU 3, whereas the output signal of the circuit 36 designates communication from the other CPU 3.

The above embodiment is directed towards the data processing system using two CPUs (CPU 2 and CPU 3). However, this invention is applied to a system using three CPUs or more.

As described above, with the present invention, each processor with fatal failure or possible failure is separated from the multiprocessing system on the basis of the result of the predictive diagnosis executed by the individual processors, resulting in improvement in the reliability of the system.

What is claimed is:

1. In a multiprocessor of the type having at least two processors, a system for controlling the interconnection of said at least two processors based on diagnostic results in each of the processors, said system including means for selecting one of said processors as a host processor, an initialization interconnection path, and a communication interconnection path, each of said processors comprising:
   (a) first means for connecting said processor to said initialization interconnecting path during an initialization sequence,
   (b) second means responsive to a host selection signal from said selecting means for sending a subprocessor selection signal via said initialization interconnecting paths to said other processors,
   (c) third means responsive to either a host selection signal or a subprocessor selection signal for initiating a diagnostic routine in said processor,
   (d) fourth means responsive to said host selection signal and said subprocessor selection signal for designating said processor as a host processor and a subprocessor, respectively,
   (e) fifth means responsive to the end of said diagnostic routine and to said fourth means, for sending an end report signal on said initialization interconnection paths only if said processor is a subprocessor and no failure is detected in said diagnostic routine,
   (f) sixth means, responsive to the end of said diagnostic routine and to said fourth means, for sending a failure indication on said initialization interconnection paths only if said processor is a host and a failure is detected in said diagnostic routine, said sixth means registering a failure if it occurs in the diagnostic routine of said processor or if a failure indication is received via said initialization interconnection paths,
   (g) seventh means for providing when actuated a communication interconnection ready signal, said seventh means being actuated by said fifth means when said processor is a subprocessor and no failure is detected in said diagnostic routine,
   (h) eighth means, responsive to the end of said diagnostic routine, said fourth means, and an end report signal received via said initializing interconnection paths, for activating said seventh means only under the condition that no failure is detected, the processor is a host, and an end report signal is received within a predetermined time after the end of the diagnostic routine,
   (i) ninth means, responsive to said first means, said sixth means, and said seventh means, for connecting said processor to said communication interconnection path provided said sixth means does not register failure and said seventh means has been activated.

* * * * *